(12) United States Patent
Smirnov et al.

(10) Patent No.: US 7,768,018 B2
(45) Date of Patent: Aug. 3, 2010

(54) POLARIZER BASED ON A NANOWIRE GRID

(75) Inventors: Valery K. Smirnov, Yaroslavl (RU);
Dmitry S. Kibalov, Yaroslavl (RU)

(73) Assignee: Wostec, Inc., San Francisco, CA (US)

(*) Notice: Subject to any disclaimer, the term of this patent is extended or adjusted under 35 U.S.C. 154(b) by 44 days.

(21) Appl. No.: 11/421,384

(22) Filed: May 31, 2006

(65) Prior Publication Data
US 2006/0273067 A1 Dec. 7, 2006

Related U.S. Application Data

(63) Continuation-in-part of application No. 11/385,355, filed on Mar. 21, 2006, which is a continuation of application No. PCT/RU2004/000396, filed on Oct. 8, 2004.

(60) Provisional application No. 60/686,495, filed on Jun. 1, 2005.

(30) Foreign Application Priority Data

Oct. 10, 2003 (RU) .............................. 2003129927

(51) Int. Cl.
*H01L 27/15* (2006.01)
*H01L 21/00* (2006.01)

(52) U.S. Cl. .................. 257/80; 257/81; 257/E21.215; 257/E21.219; 438/29; 438/974; 438/982; 216/24

(58) Field of Classification Search ............... 438/5, 438/7, 29, 946, 974, 975, 982; 257/80, 81, 257/98; 216/24; 428/310.5; 264/1.31
See application file for complete search history.

(56) References Cited

U.S. PATENT DOCUMENTS

| 4,009,933 | A | 3/1977 | Firester |
| 4,233,109 | A | 11/1980 | Nishizawa et al. |
| 4,400,409 | A | 8/1983 | Izu et al. |
| 6,274,007 | B1 * | 8/2001 | Smirnov et al. ........ 204/192.13 |

(Continued)

FOREIGN PATENT DOCUMENTS

RU 2 173 003 8/2001

(Continued)

OTHER PUBLICATIONS

Karen, A. et al. (1995) "Quantitative Investigation of the O2+-induced Topography of GaAs and Other III-V Semiconductors: an STM Study of the Ripple Formation and Suppression of the Secondary Ion Yield Change by Sample Rotation;" Surface and Interface Analysis, vol. 23, pp. 506-513.

(Continued)

*Primary Examiner*—Hsien-ming Lee
(74) *Attorney, Agent, or Firm*—Frommer Lawrence & Haug LLP; Bruce E. Black (57) ABSTRACT

The preferred embodiment provides for development and use of an array of nanowires with a period smaller then 150 nm for applications such as an optical polarizer. To manufacture such structures the preferred embodiment employs a hard nanomask. This nanomask includes a substantially periodic array of substantially parallel elongated elements having a wavelike cross-section.

11 Claims, 10 Drawing Sheets

U.S. PATENT DOCUMENTS

| | | |
|---|---|---|
| 6,417,939 B1 * | 7/2002 | Laude ............................ 359/3 |
| 6,452,724 B1 | 9/2002 | Hansen et al. |
| 6,518,194 B2 * | 2/2003 | Winningham et al. ....... 438/717 |
| 6,667,240 B2 | 12/2003 | Ozaki et al. |
| 2002/0142704 A1 | 10/2002 | Hu et al. |
| 2003/0152787 A1 | 8/2003 | Arakawa et al. |
| 2003/0171076 A1 | 9/2003 | Moloney et al. |
| 2004/0070829 A1 | 4/2004 | Kurtz et al. |
| 2004/0174596 A1 | 9/2004 | Umeki |
| 2004/0201890 A1 | 10/2004 | Crosby |
| 2005/0046943 A1 | 3/2005 | Suganuma |
| 2006/0273067 A1 | 12/2006 | Smirnov et al. |

FOREIGN PATENT DOCUMENTS

| | | |
|---|---|---|
| RU | 2 180 885 | 3/2002 |
| RU | 2204179 | 5/2003 |
| RU | 2 240 280 | 11/2004 |
| WO | WO-2005/050697 | 6/2005 |

OTHER PUBLICATIONS

Vajo, J.J. et al. (1996) "Influence of O2+ Energy, Flux, and Fluence on the Formation and Growth of Sputtering-Induced Ripple Topography on Silicon," J. Vac. Sci. Technol. A, 14(5), pp. 2709-2720.

Scott, K.L. et al. (2000) "Pattern Generators and Microcolumns for Ion Beam Lithography," J. Vac. Sci. Technol. B, 18(6):3172-3176.

* cited by examiner

POLARIZER BASED ON A NANOWIRE GRID

RELATED APPLICATIONS

This application claims the benefit of U.S. Provisional Patent Application Ser. No. 60/686,495, filed Jun. 1, 2005, and is a continuation-in-part of U.S. patent application Ser. No. 11/385,355, filed Mar. 21, 2006, which is a continuation of PCT/RU2004/000396, filed Oct. 8, 2004, which claims the benefit of Russian Application No. 2003129927, filed Oct. 10, 2003, all of which are hereby incorporated by reference in their entirety.

FIELD OF THE INVENTION

The invention relates to non-lithographic methods for manufacturing devices such as a polarizer, comprised of a grid of metal conductors, located on the surface of an optically transparent substrate or embedded into the substrate, by filling grooves on the substrate with metal. It also generally relates to methods and devices for forming periodic wire grids with a period of 150 nm or less.

BACKGROUND OF THE INVENTION

Wire grid polarizers are widely used in devices for graphic information imaging (e.g., see U.S. Pat. No. 6,452,724, incorporated herein by reference). The commonly-used technology for manufacturing these devices is based on optical or interference lithography. However, the cost associated with the use of the tools designed for these applications is considered very significant. The existing approach and tools make it difficult to scale the production from smaller semiconductor wafer sizes to larger area substrates (such as glass sheets or plastic). In addition, the existing approach makes it is very difficult to create wire grid structures with a period of 150 nm or less. While different applications have different requirements, structures with smaller feature size are usually associated with higher performance.

A method for nanorelief formation on a film surface, comprising plasma modification of a wave ordered nanostructure (WOS) formed on amorphous silicon layer, was disclosed in Russian Patent Application RU 2204179, incorporated herein by reference.

Figure 1:
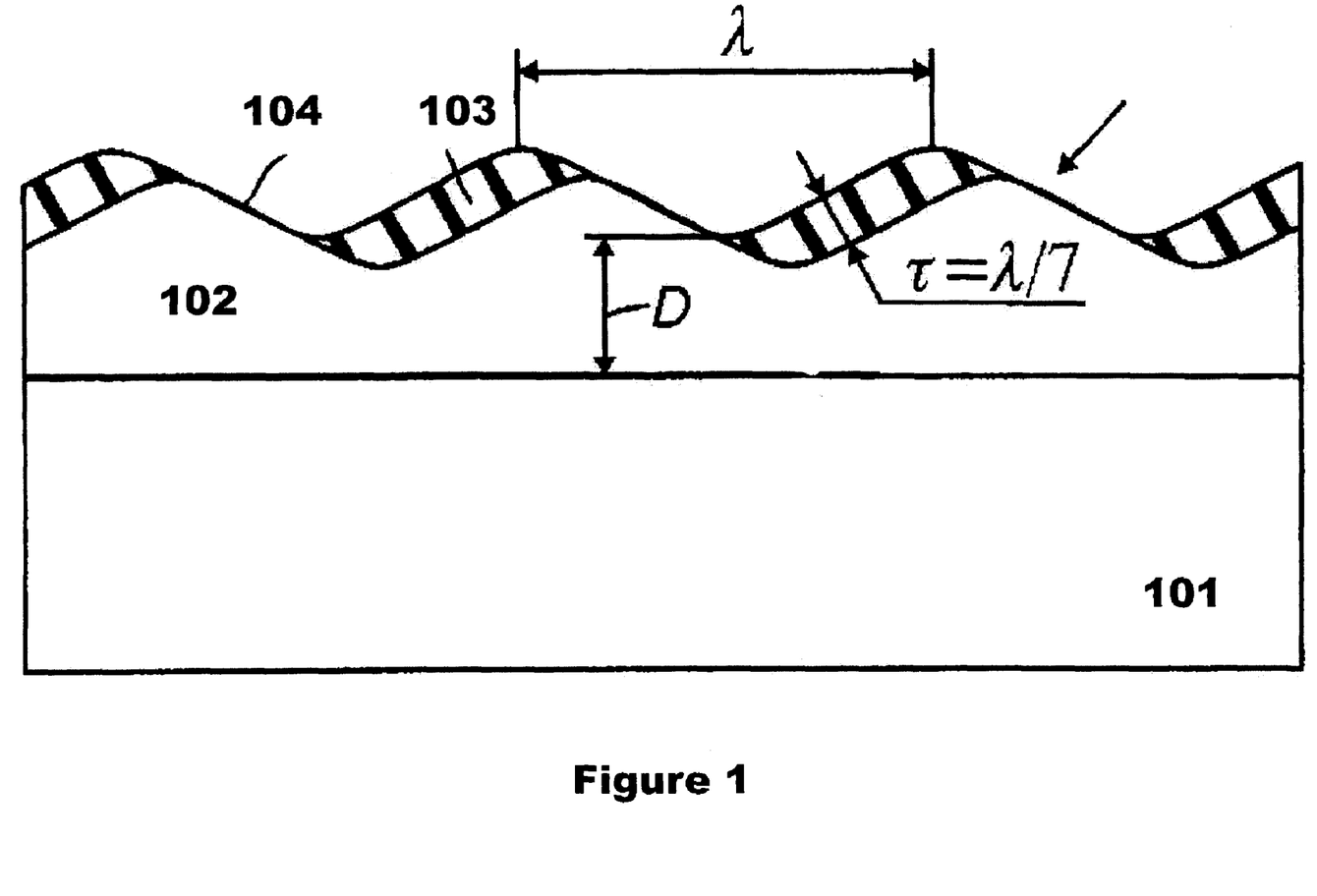
FIG. 1 schematically illustrates a nanorelief formation on a film surface in a $N2^+$-Si system.

This approach is schematically illustrated on FIG. 1. It includes the following steps. First, a layer of amorphous silicon 102 is deposited on top of the target thin film layer 101. Then, this silicon layer is sputtered with a flow of nitrogen ions so as to create an array of wave ordered nanostructures. The resultant wave-ordered nanostructure comprises relatively thick regions of amorphous silicon nitride 103 and relatively thin regions of amorphous silicon nitride 104 situated respectively on the front and back sides of the wave structure 104. As shown, the wave troughs are spaced from the surface of the film layer 101 by a distance D equal to about one third of the nanostructure wavelength ($\lambda$). After the wave-ordered nanostructure is formed, its planar pattern is transferred into the underlying film layer 101 by selectively etching the amorphous silicon layer 102 while using regions 103 and 104 as a nanomask.

Figure 2:
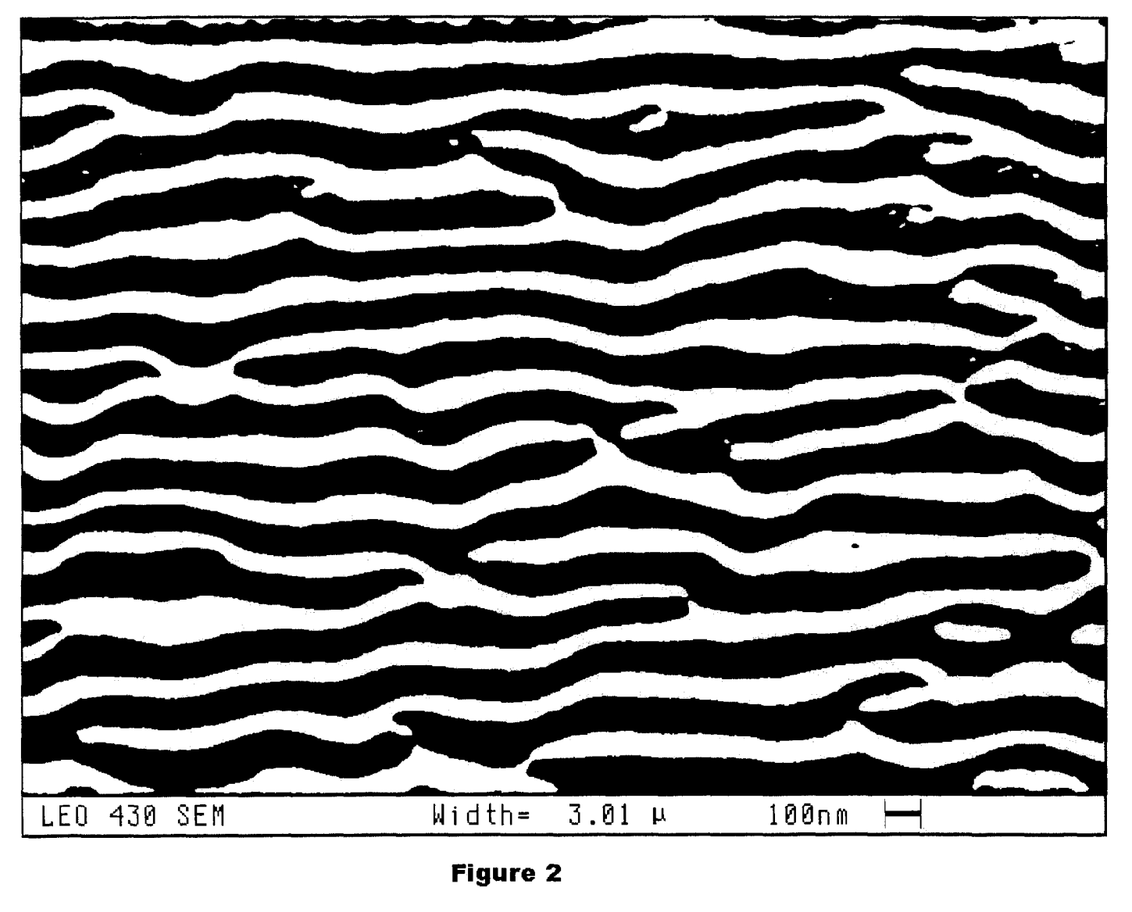
FIG. 2 shows a SEM-image of one embodiment of a wavelike nanostructure formed in $N2^+$-Si system without a preliminary orienting treatment.

However, experiments using nanostructures obtained by oblique sputtering of amorphous silicon with nitrogen ions ($N2^+$-Si system) showed that these structures often do not possess a desired degree of natural ordering (i.e., high coherency). FIG. 2 shows an array of nanostructures manufactured by this technique. The figure shows that even in a relatively small area this array has a significant number of defects. It may not be sufficiently coherent enough for optoelectronic applications.

SUMMARY OF THE INVENTION

A variety of optoelectronic applications can benefit from the development of efficient methods for forming large arrays of nanowires with a period of 150 nm or less.

To manufacture such structures the present invention employs a hard nanomask, formed by irradiating a layer of a first material with an ion flow. The mask is intended for use in transferring a substantially periodic pattern onto a thin film. This nanomask includes a substantially periodic array of substantially parallel elongated elements having a wavelike cross-section. At least some of the elements have the following cross-section: an inner region of first material, a first outer region of a second material covering a first portion of the inner region, and a second outer region of the second material covering a second portion of the inner region and connecting with the first outer region at a wave crest. The first outer region is preferably substantially thicker than the second outer region. The second material is formed by modifying the first material by ion flow.

DETAILED DESCRIPTION OF THE PREFERED EMBODIMENTS

Detailed descriptions of the preferred embodiments are provided herein. It is to be understood, however, that the present inventions may be embodied in various forms. Therefore, specific implementations disclosed herein are not to be interpreted as limiting.

A preliminary treatment (a treatment applied before the sputtering step) of the amorphous silicon layer, causing a uniform anisotropic stress within this layer, considerably increases the degree of nanostructure pattern orientation (i.e., its coherency.)

According to this approach, the layer in which the wave ordered structure (WOS) will be built is manufactured so that there is a substantially uniform mechanical anisotropic stress. The stress can be induced during the deposition process by applying an anisotropic surface treatment or additional irradiation, or after the deposition, before or simultaneously with ion bombardment.

In one preferred embodiment, an oriented polishing (a polishing of the surface in one preferred direction) in a direction of the wave crests of a wavelike nanostructure to be formed is used as a preliminary step before the formation of the nanostructure, thereby, considerably increasing a degree of the pattern orientation (i.e. its coherency.)

Figure 3:
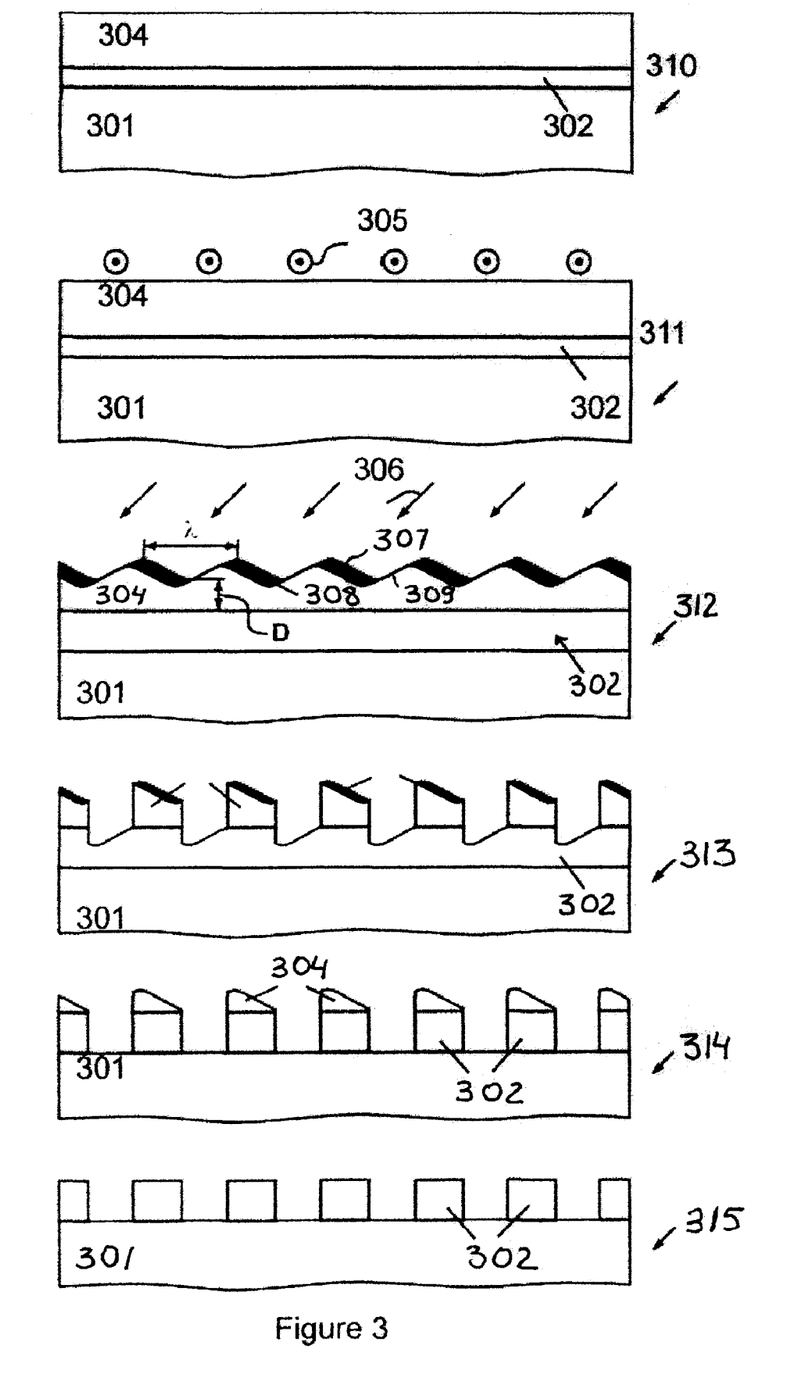
FIG. 3 schematically illustrates steps in one embodiment of a method for formation of a wire grid polarizer.

FIG. 3 illustrates a preferred embodiment of the present invention used to manufacture a wire grid polarizer on a transparent glass substrate. It shows a structure 310, comprising a substrate (e.g., glass) 301, metal film 302, (for example aluminum, copper, silver, or other conductive metals, approximately 70 nm thick), and an amorphous silicon layer 304 (approximately 210 nm thick).

The amorphous silicon layer 304 is deposited by magnetron sputtering of a silicon target, by silicon target evaporation with an electron beam in high vacuum, or by another method known in art. The thickness of the layer 304 is selected to enable the formation of a nanostructure with wavelength, $\lambda$, approximately equal to 70 nm.

The surface of layer 304 is subjected to an orienting treatment (a polishing of the surface in one preferred direction) with a slurry or powder, whose particle size is not greater than a value approximately equal to two wavelengths of the wave ordered nanostructure, to achieve a sufficiently anisotropic plastic deformation of the silicon surface. In this example, the treatment direction 305 is perpendicular to the drawing plane of FIG. 1. The structure 311 is the result of the abovementioned treatment.

In one preferred embodiment, the slurry is a GOI paste containing $Cr_2O_3$ particles. It has also been demonstrated that a variety of water based or toluene slurries containing small particles (such as alumina, silica, or chromium oxide) can be used for the orienting treatment instead of a GOI paste. For example, a number of suspension systems, similar to Ultra-Sol 7H™ colloidal silica manufactured by Eminess Technologies, Inc., can be used. This class of slurry systems is already used in a variety of industrial polishing application in semiconductor manufacturing.

Devices for chemical—mechanical polishing (CMP) are widely used for polishing wafers in semiconductor manufacturing. The primary purpose of these devices is to reduce the thickness of the substrate without providing an orientation to the polishing. An example of this device was disclosed in U.S. Patent Application Publication No. 2002/0142704 incorporated herein by reference. This device comprises a wafer holder for wafer rotation around its axis, a constantly running band held by a support in a place where the wafer surface contacts with the band, motors for enabling the wafer holder rotation and the band movement, devices for supplying a polishing mixture onto the band, and devices for supplying air through the system of apertures to enable the band support and even distribution of the wafer pressure on to the band. However, this device is not designed to be used for oriented polishing.

Figure 4:
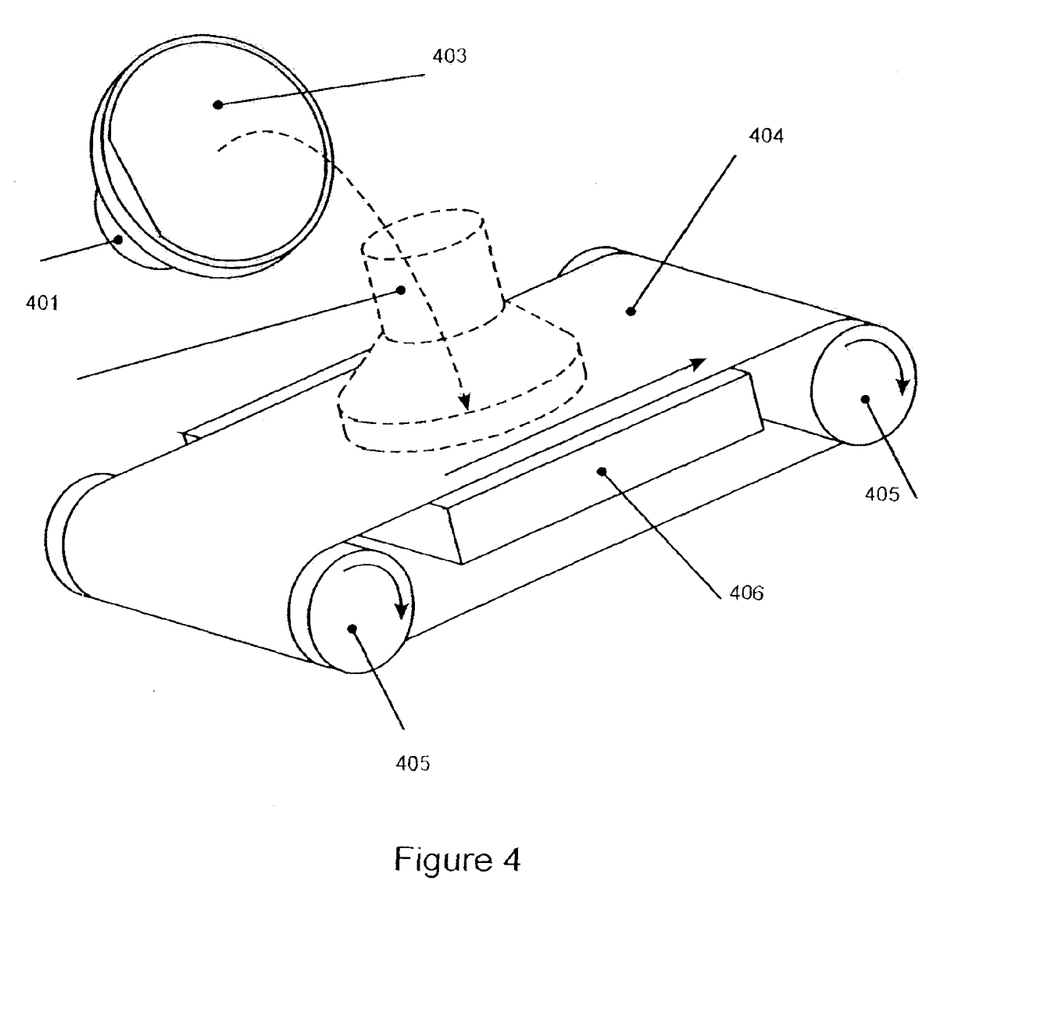
FIG. 4 schematically illustrates a device for a preliminary orienting polishing.

By eliminating the rotation of the wafer holder around its axis and securing it in a required position relative to the direction of the running band movement, this device can be modified for oriented polishing. FIG. 4 schematically shows a device for oriented polishing. It consists of a wafer holder 401, shown in an inoperative position. The holder is used for wafer installation. In an operative position 402, the holder presses the wafer 403 to a continuous band 404, set in motion by rolls 405. The wafer holder provides for a fixed position of the wafer 403 relative to a direction of the band 404. A support 406 keeps the band 404 and the wafer holder in the operative position. The support has a system of apertures to let the compressed air flow through, thus providing for an even distribution of the pressure of the wafer onto the band. In addition, polishing slurry is supplied onto the band (FIG. 4 does not show a device for supplying slurry). The rolls 405 and a lower part of the band 404 can be submerged into a polishing slurry bath. A selection of an appropriate abrasive (with particle size is not greater than a value approximately equal to two wavelengths of the wave ordered nanostructure) for the polishing slurry, (for example, silica or alumina are widely used for polishing in semiconductor manufacturing), leads to a better coherence of a wavelike nanostructure after a subsequent ion sputtering step.

After the preliminary treatment a hard nanomask is formed by modifying the surface layer by ion bombardment. For example, referring to FIG. 3, in one preferred embodiment, in this step, the surface of layer 304 is irradiated by a substantially homogeneous flow 306 of nitrogen molecular ions $N_2^+$ for about 2 minutes. To achieve a nanostructure wavelength approximately equal to 70 nm the nitrogen ion bombardment angle is approximately equal to 52°. The ion energy is approximately equal to 4 keV. The nanostructure formation depth $D_F$ is approximately equal to 70 nm. The irradiation is performed so that the plane of ion incidence (the plane which is defined by a normal to the surface of the material and a vector oriented in the direction of the ion flow) is perpendicular to the direction of the preliminary orienting treatment. The process leads to formation of a wave ordered nanomask 307.

As it is schematically illustrated on FIG. 3, the nanomask 307 is a substantially periodic array of hard wavelike asymmetrical nanostructures. These structures are comprised of relatively thick 4-15 nm silicon nitride region 308 on the front (the side facing the ion flow) followed by a relatively thin 0.1-2 nm silicon nitride region 309 on the back (with respect to ion flow 306) side covering the layer of amorphous silicon 304. The thickness of the region is defined as an average thickness of the layer measured along a local normal to the surface of the wavelike structure. This periodic array of hard wavelike structures is an array of substantially parallel elongated elements with a length that is much larger than its breadth. The distance D between the nanostructure troughs and film surface 302 is approximately equal to a range form one to one third of the nanostructure wavelength. Nanostructure wave crests are formed at right angles to the ion bombardment plane, coinciding with the drawing plane of FIG. 3, and parallel to the direction of the orienting treatment. Since the thickness of the silicon nitride on the front side is much larger then on the back side and since the silicon nitride is hard and durable, this nanomask is particularly suited for transferring patterns into the underlying layers using anisotropic etching techniques.

While the described above preferred embodiments illustrate the formation of the nanomask by the modification of an amorphous silicon layer by oblique sputtering with nitrogen ions, similar results can be obtained using different materials (for example, nanocrystalline silicon, crystalline silicon, crystalline gallium arsenide etc.) and different ions (for example, nitrogen $N_2+$, $N+$, nitrogen-oxygen $NO+$, nitrogenhydrogen $NH_m+$, oxygen $O_2+$, argon $Ar+$, krypton $Kr+$, xenon $Xe+$, and a mixture of argon $Ar+$ and nitrogen $N_2+$).

Figure 5:
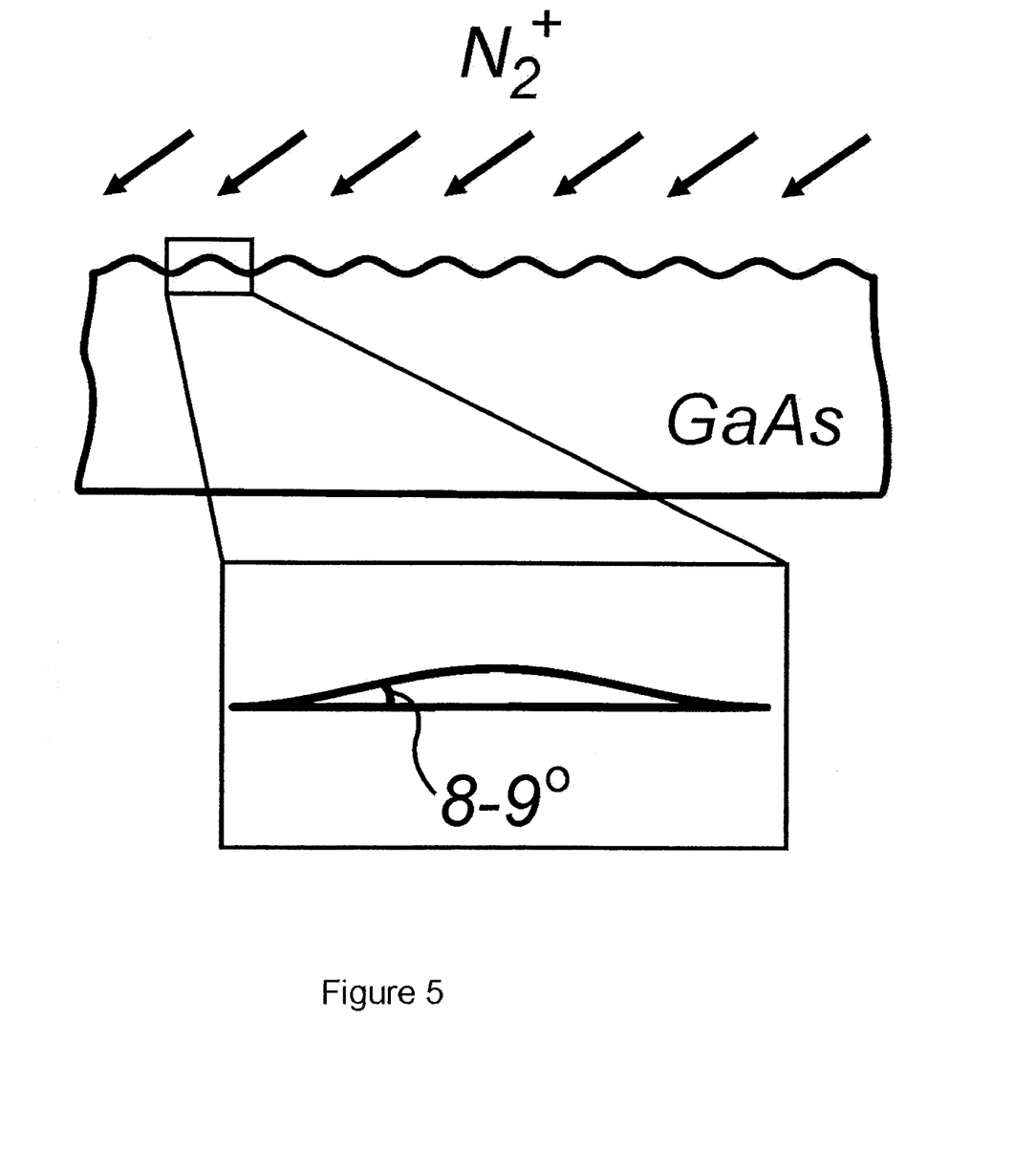
FIG. 5 schematically illustrates a process of formation of a coherent low-amplitude wavelike nanostructure upon a gallium arsenide surface by sputtering with $N2^+$ ions and the geometry of an individual wave according to a preferred embodiment.
Figure 6:
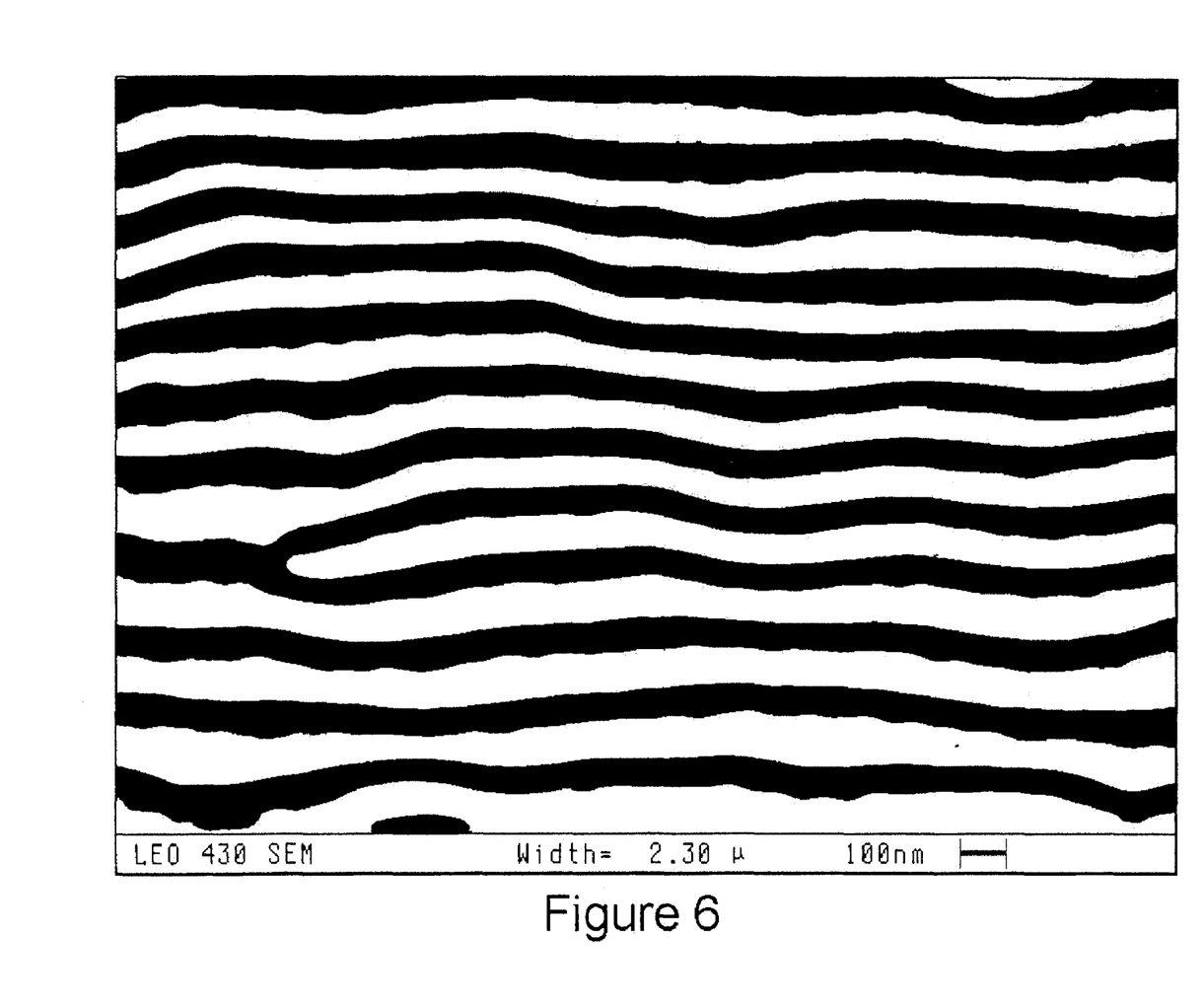
FIG. 6 shows a SEM-image of a wavelike nanostructure formed in an $O_2^+$—Si system at a depth $D_m$ after a subsequent additional sputtering with $N2^+$ ions according to a preferred embodiment.

In yet another preferred embodiment, illustrated by FIG. 5, the nanomask formation step is performed by sputtering a gallium arsenide layer with nitrogen ions ($N_2^+$—GaAs system). An ion beam is scanned in a raster pattern on the surface of the material to provide for a homogeneous ion flux. FIG. 6 shows a view coinciding with a plane of ion bombardment (i.e. a plane of ion incidence), the plane is defined by a normal to the surface of the material and a vector oriented in the direction of the ion beam (i.e. ion flow.) For example, a highly coherent wavelike nanostructure with a wavelength of $\lambda=130$ nm is formed by choosing the angle of ion bombardment relative to the normal of a GaAs surface in the range approximately equal to $\theta=55-58°$ with the $N_2^+$ ion energy about $E=8$ keV and a sputtering depth DF of about 1 µm. This nanostructure has almost no wave abruptions and a very small number of wave intersections. The irradiation dose up to a sputtering depth of 35 µm, the nanostructure does not undergo any significant transformations. Observation through a scanning electron microscope (SEM) of a GaAs crystal sample with a wavelike nanostructure obtained at $E=8$ keV and $\theta=56°$ showed the wave amplitude was 13 nm at $\lambda=130$ nm. The wave's slopes were inclined by 8-9° relative to the horizontal direction. Consequently, the local angles of bombardment of the waves' slopes are equal to 47° and 65° and protracted sputtering does not alter these angles.

In yet another preferred embodiment, the preliminary orienting treatment step was performed by sputtering the surface layer of amorphous silicon with oxygen ions so that first, in the $O_2^+$—Si system, a wavelike nanostructure was formed with $\lambda=130$ nm at $E=4$ keV and $\theta=47°$ at a sputtering depth Dm=1350 nm. Consequently, in the second stage, the resulting nanostructure was formed by sputtering with nitrogen ions. The parameters for the second stage were selected to achieve equal wavelengths in the $O_2^+$—Si and the $N_2^+$—Si systems. At the second stage, the wavelike nanostructure was sputtered with $N_2^+$ ions at $E=8$ keV and $\theta=43°$ up to a final depth D=1670 nm. The depth of the additional sputtering in the $N_2^+$—Si system is equal to 320 nm and is sufficient for forming the wavelike nanostructure. The bombardment planes for $O_2^+$ and $N_2^+$ ions coincided. This two-stage process resulted in a wavelike nanostructure with $\lambda=140$ nm shown in FIG. 6.

Figure 7:
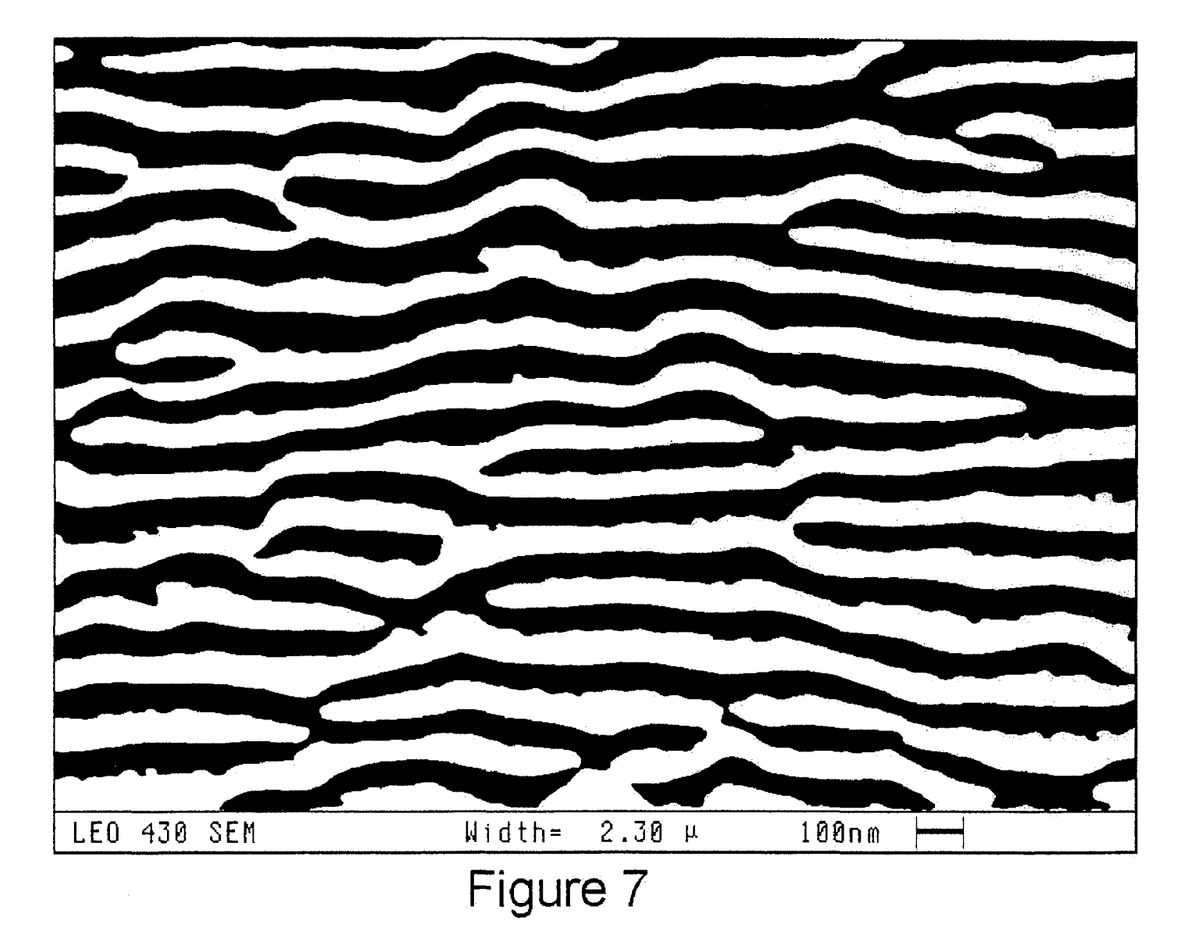
FIG. 7 shows a SEM-image of a wavelike nanostructure formed in a $N2^+$-Si system.

For comparison purposes, FIG. 7 shows the image of a wavelike nanostructure formed in one-stage process in the $N_2^+$—Si system at $E=8$ keV and $\theta=43°$. A statistical analysis of SEM-images with a size of 6.77×9 µm² was carried out by counting the number of waves in the 1.3 by 6.5 µm² frames oriented by a long side perpendicular to the wave crests and each containing 50 waves. The number of the waves passing from one long edge of the frame to the other without abruptions and intersections (a quantity of good waves), the number of waves crossing one of the edges but not reaching the other edge (a quantity of the wave abruptions) and the number of waves intersecting inside the frame were counted. The results showed that a two-stage process of forming a $N_2^+$—[$O_2^+$—Si] wavelike nanostructure decreases the number of wave abruptions by 5.4 times, the number of wave intersections by 2.9 times, and increases the quantity of good waves by 2.4 times.

While in the described above preferred embodiment the preliminary orienting treatment step (sputtering the surface layer of amorphous silicon with oxygen ions) was done after the surface layer was deposited on top of the metal layer, similar results could be obtained by combining the preliminary orienting treatment step (for example, a preliminary step comprising inducing an anisotropic stress by applying ion irradiation) with the deposition step (for example, by pre-stressing the surface layer in ion beam assisted deposition (IBAD) tool during the deposition process).

Referring again to FIG. 3, after the nanomask is formed, the structure 312 is modified by applying a reactive-ion plasma ($Cl_2$, $Cl_2$—Ar, or $Cl_2$—He—$O_2$ or by any other method known in art) to the amorphous silicon layer 304, using the original nanomask 307. In one preferred embodiment, the process results in a modified nanomask comprising silicon nitride regions 308 formed on top of 75 nm stripes of amorphous silicon 304, as shown structure 313 of FIG. 3.

In the next step anisotropic etching is applied to the metal layer 302. If the metal layer is an aluminum layer, a $BCl_3$—$CCl_4$, $BCl_3$—$Cl_2$—$O_2$, $BCl_3$—$Cl_2$—$N_2$ or $HBr$—$Cl_2$—He—$O_2$ mixture can be used, for example. The resulting structure 314 comprises metal stripes with the remnants of amorphous silicon 304 on top. In the structure 315, the remnants of the amorphous silicon mask can be removed using a plasma such as $SF_6$—$O_2$.

Depending on the chosen thickness of the modified layer on the back side of the wavelike nanostructure, a preliminary breakthrough etching step might be performed using argon based sputtering or a $BCl_3$—$Cl_2$ plasma for a relatively short period of time to remove the modified layer from the back side.

Depending on the properties of the interface between the layer where the nanomask is formed and the underlying target layer, an additional breakthrough etching step might be used to transfer the pattern through the interface. For certain combination of materials, both layers could be successfully etched in the same plasma.

Figure 8:
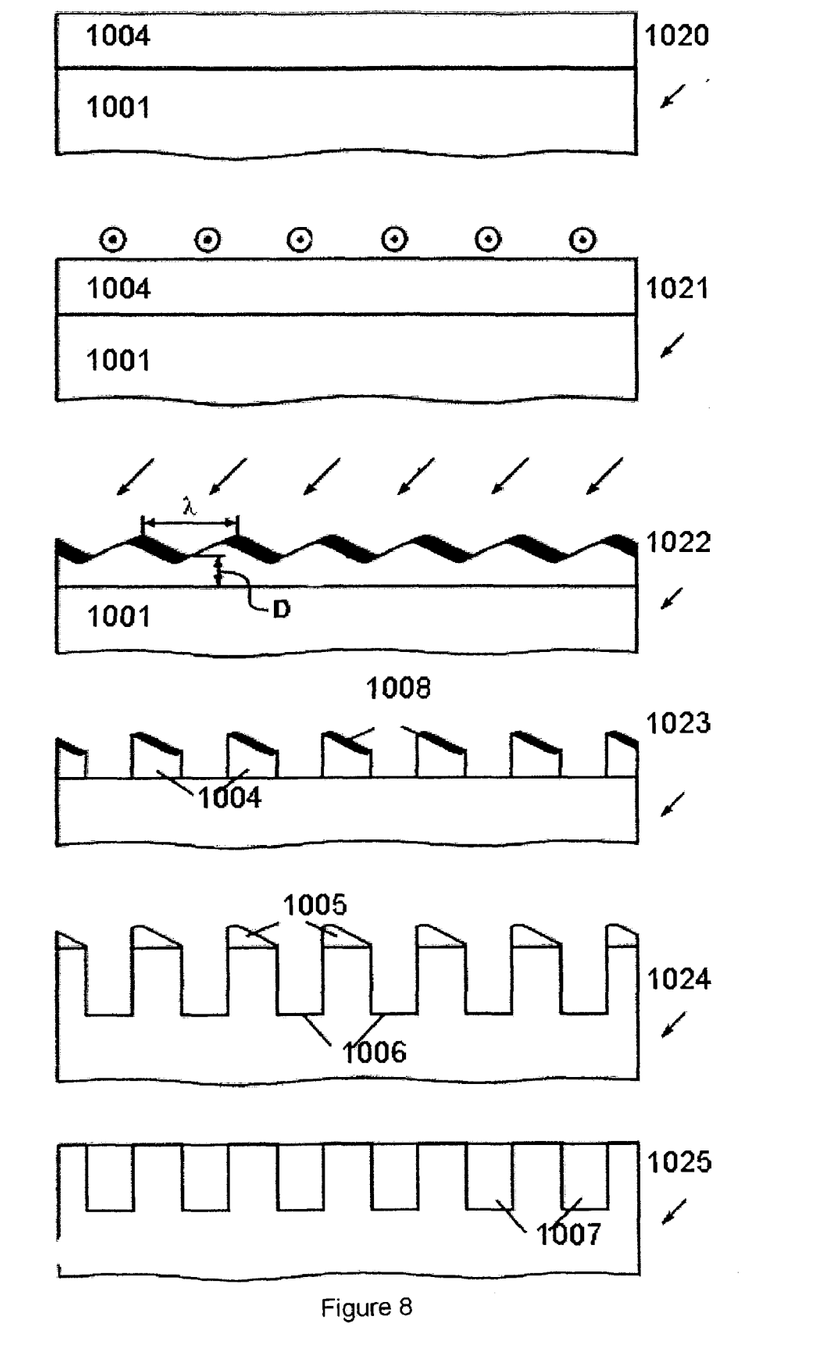
FIG. 8 schematically illustrates one embodiment of steps for manufacturing a wire grid polarizer with the wire grid located inside the transparent substrate.

FIG. 8 schematically illustrates a preferred embodiment of the present invention used to manufacture a wire grid polarizer with the wire grid located inside the transparent substrate.

First, a layer of amorphous silicon with thickness approximately equal to 1.5-3 times the value of the depth of a nanostructure is deposited on top of an optically transparent substrate. FIG. 8 schematically illustrates the resulting structure 1020, comprising a substrate (e.g., glass) 1001 and an amorphous silicon layer 1004 (approximately 400 nm thick). The amorphous silicon layer 1004 is deposited by magnetron sputtering of a silicon target, by silicon target evaporation using an electron beam in high vacuum, or by another method known in art. In this example, the thickness of the layer 1004 is selected to enable the formation of a nanostructure with a wavelength of approximately 150 nm.

Next, the surface of the amorphous silicon is subjected to an orienting treatment and ion sputtering, step similar to the one described in connection with FIG. 3, resulting in the structures 1021, 1022 and 1023. The wavelength of the nanostructure is chosen in the range from about 20 to 150 nm to satisfy the optical design requirements for a particular application.

The nanomask is modified by partially removing nanostructure material so that the resulting nanomask comprises silicon nitride stripes 1008 and amorphous silicon 1004 on top of the optically transparent substrate. The nanomask pattern is transferred into the substrate by removing parts of the substrate not covered by the nanomask.

The grooves 1006, in the optically transparent substrate (structure 1024), are formed by anisotropic etching. Depending on the type of the substrate material, different types of plasma can be used (for example, for a quartz substrate, $CF_4$—$H_2$ or $CHF_3$ based plasma can be used).

After grooves of the desired depth are formed in the substrate, the remnants of the nanomask material 1005 are completely removed from the substrate surface $SF_6$—$O_2$ based plasma. Then, the grooves 1006 in the substrate are filled with metal 1007 and the remnants of the metal are cleaned from substrate. If necessary, the surface of the structure 1025 is covered with an anti-reflecting coating.

In all the above described preferred embodiments different types of transparent substrates can be used. In some embodiments, the substrates are transparent films capable of being laminated to glass.

Figure 9:
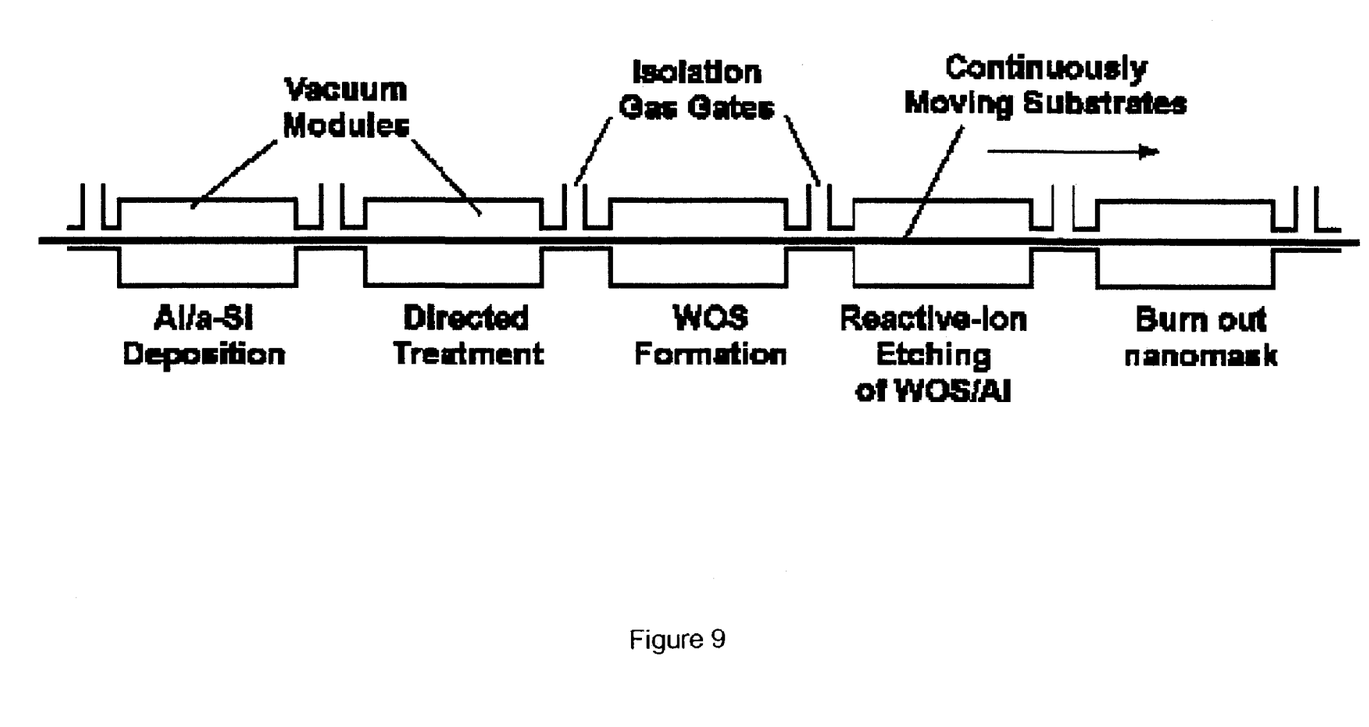
FIG. 9 schematically illustrates a production line implementing one embodiment of the present invention on a continuously moving substrate.

In some embodiments all process steps can be carried out on moving substrates. Therefore, it is useful to integrate all equipment necessary for the processes into a conveyor. Schematically, an example of such a conveyor is presented in FIG. 9. Vacuum modules are connected into a production line to apply successive process steps to the surface of the continuously moving substrate. A similar approach is known to be used in the manufacturing of photovoltaic solar cells (see Izu M. et al. "Method of p-doped silicon films"—U.S. Pat. No. 4,400,409; Ozaki H. et al. "Method and apparatus for forming deposited film"—U.S. Pat. No. 6,667,240, both incorporated herein by reference). Each module is separated from the next one by isolation gas gates. Before the process starts the whole line is evacuated to a base pressure approximately equal to about $10^{-6}$ Torr.

Figure 10:
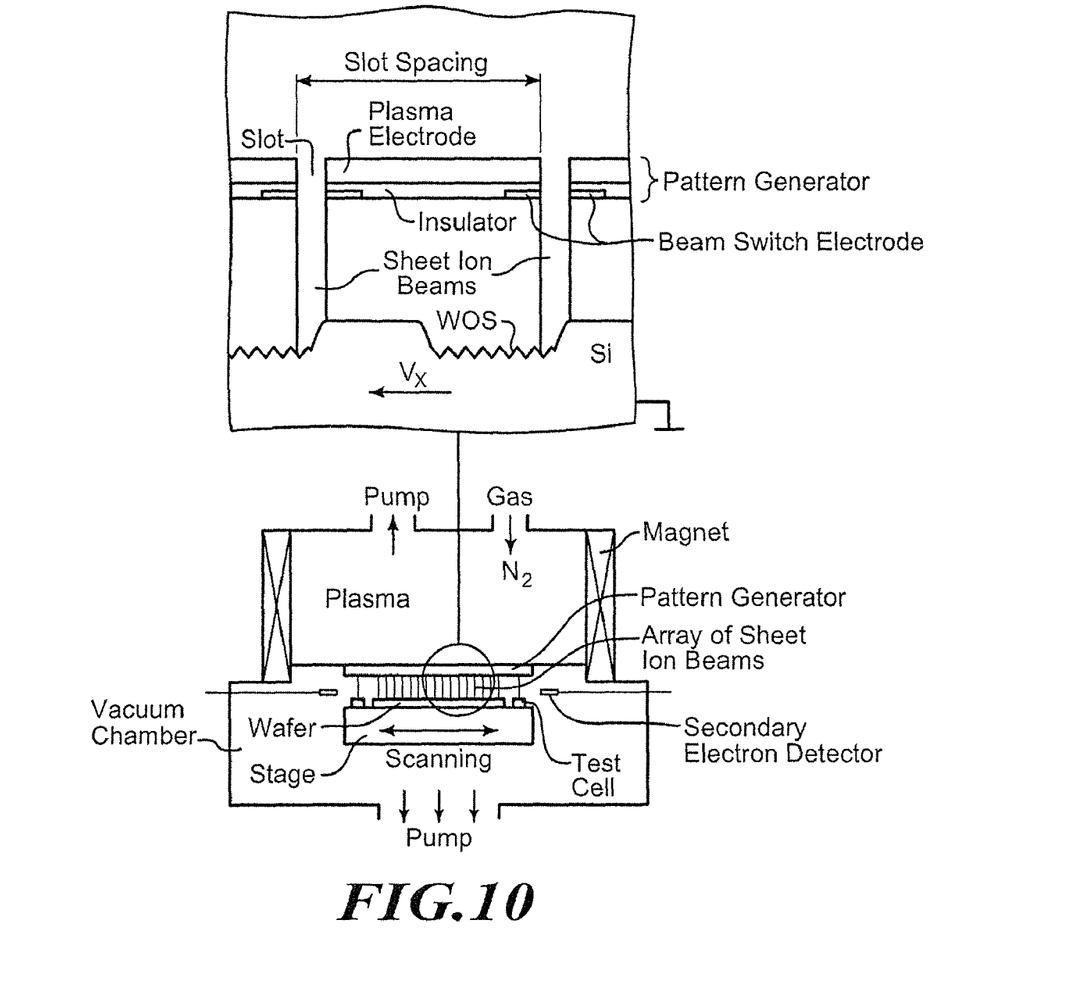
FIG. 10 schematically illustrates a plasma based ion beam based systems for ion beam sputtering according to one embodiment of the present invention.

The uniformity of the ion flow in the WOS formation module can be provided by a cellular arrangement of wide-aperture ion sources. In some embodiments, a system based on multi-cusp ion beam sources can be used. An additional advantage of such systems is in high throughput due to the fact that in this configuration the ion beams are orthogonal to the substrates. In some embodiments, multi-cusp ion beam based systems can be used without orienting treatment as shown in FIG. 10.

The invention can be used for forming nanowires arrays for nanoelectronics and optoelectronics devices.

What is claimed is:

1. A hard nanomask, comprising:
a substantially periodic array of substantially parallel, separated, elongated elements having a wavelike cross-section, at least some of the elements having the following structure in cross-section: an inner region of a first material, and a first outer region of a second material covering a first portion of the inner region, wherein a surface of the first material is treated to orient the surface prior to generating the substantially parallel, separated, elongated elements having the wavelike cross-section, wherein the surface of the first material is oriented by polishing the surface of the first material in a first direction.

2. The nanomask of claim 1, wherein a wavelength of the substantially periodic array is in a range from 20 to 150 nm.

3. The nanomask of claim 1, wherein the first material is selected from a group consisting of silicon, amorphous silicon, silicon oxide, gallium arsenide and epitaxial gallium arsenide, germanium and silicon-germanium.

4. The nanomask of claim 1 wherein a thickness of the first outer region is at least 4 nm.

5. The nanomask of the claim 1, further comprising a second outer region of the second material covering a second portion of the inner region connecting with the first outer region at a wave crest, wherein the first outer region is substantially thicker than the second outer region, and wherein the second material is formed by modifying the first material by an ion flow.

6. The nanomask of the claim 5, wherein a thickness of the second outer region is no more than 2 nm.

7. The nanomask of claim 5, wherein the second material is silicon nitride, silicon-germanium nitride, silicon oxide, gallium arsenide nitride or gallium arsenide oxide.

8. The nanomask of claim 5, wherein the ion flow is selected from the group consisting of $N_2^+$, $N^+$, $NO^+$, $NH_m^+$, $O_2^+$, $Ar^+$, $Kr^+$, $Xe^+$, and a mixture of $Ar^+$ and $N_2^+$.

9. The nanomask of claim 1, wherein the polishing is performed using a slurry comprising particles chosen from a group consisting of alumina particles, silica particles and chromium oxide particles.

10. The nanomask of claim 1, wherein the polishing is performed using water or toluene based slurry comprising alumina, silica, or chromium oxide particles.

11. The nanomask of claim 1, wherein the polishing is performed using a slurry comprising small particles, wherein the particle size of the small particles is not greater than a value approximately equal to two wavelengths of the substantially periodic array.

* * * * *